US008967363B2

(12) United States Patent
Lowery

(10) Patent No.: US 8,967,363 B2
(45) Date of Patent: Mar. 3, 2015

(54) HIGH VOLUME EXCAVATING AND LOADING APPARATUS AND METHOD

(71) Applicant: Sterling Wayne Lowery, Glen Allen, VA (US)

(72) Inventor: Sterling Wayne Lowery, Glen Allen, VA (US)

( * ) Notice: Subject to any disclaimer, the term of this patent is extended or adjusted under 35 U.S.C. 154(b) by 68 days.

(21) Appl. No.: 13/770,303

(22) Filed: Feb. 19, 2013

(65) Prior Publication Data

US 2014/0231215 A1 Aug. 21, 2014

(51) Int. Cl.

| | |
|---|---|
| ***B65G 41/00*** | (2006.01) |
| ***E02F 7/02*** | (2006.01) |
| ***B02C 1/00*** | (2006.01) |
| ***E02F 3/32*** | (2006.01) |

(52) U.S. Cl.

CPC . *E02F 7/026* (2013.01); *B02C 1/00* (2013.01); *E02F 3/32* (2013.01)

USPC .............................. 198/314; 198/315; 37/305

(58) Field of Classification Search

USPC ......... 198/311, 312, 314, 315, 317, 318, 617; 37/304, 305; 414/503

See application file for complete search history.

(56) References Cited

U.S. PATENT DOCUMENTS

| | | | | |
|---|---|---|---|---|
| 2,834,127 | A * | 5/1958 | Kolbe | 37/189 |
| 3,195,251 | A * | 7/1965 | Mittry, Jr. | 37/190 |
| 4,184,581 | A | 1/1980 | Crawshay et al. | |
| 4,379,672 | A | 4/1983 | Hunter | |
| 4,635,664 | A * | 1/1987 | Theurer et al. | 134/131 |
| 4,702,524 | A | 10/1987 | Mork et al. | |
| 4,785,560 | A * | 11/1988 | Hanson | 37/190 |
| 4,858,347 | A | 8/1989 | Hanson et al. | |
| 5,214,866 | A * | 6/1993 | Hackmack | 37/305 |
| 5,228,220 | A * | 7/1993 | Bryan, Jr. | 37/364 |
| 5,404,988 | A * | 4/1995 | Konigs | 198/314 |
| 5,590,754 | A | 1/1997 | Lowery | |
| 5,857,274 | A * | 1/1999 | Rudiger et al. | 37/190 |
| 6,185,847 | B1 * | 2/2001 | Russell et al. | 37/401 |
| 6,845,859 | B2 * | 1/2005 | Grundl | 198/314 |
| 7,647,664 | B2 * | 1/2010 | Petermann et al. | 14/77.1 |
| 8,113,332 | B2 * | 2/2012 | Devlin et al. | 198/313 |

* cited by examiner

*Primary Examiner* — Douglas Hess

(57) ABSTRACT

An excavating and loading apparatus and method. The excavating and loading apparatus includes an excavator and a stacker conveyor. The excavator includes paired crawler tracks and an articulated boom with a bucket. The excavator further includes an inclined feeder conveyor with an intake end and a discharge end. A wide apron is positioned at the intake end of the feeder conveyor. The apron includes a left-hand side and right-hand side load receiving area that are arranged on opposing sides of the feeder conveyor. Two double hinged feeder blades are positioned at the apron. The feeder blades are arranged to operate asynchronously. Each feeder blade includes a main blade and a wing blade. The stacker conveyor is on paired crawler tracks and includes an intake end and a discharge end. The excavator includes a control cabin that is turreted to the crawler tracks.

17 Claims, 9 Drawing Sheets

HIGH VOLUME EXCAVATING AND LOADING APPARATUS AND METHOD

FIELD OF THE INVENTION

This invention relates to mining machinery and more specifically to an apparatus and method for high volume excavating and loading of ores.

BACKGROUND OF THE INVENTION

One of the most common arrangements for moving large quantities of heavy material such as overburden from strip mining operations, earth from excavation operations, and other similar material movement, is to use large electric or hydraulic excavators to lift the material into large trucks. Hydraulic excavators come with either front shovel boom arrangements or backhoe booms.

Large electric and hydraulic excavators are typically on crawler tracks and have a large volume bucket that is at the end of a boom and is commonly rated by the cubic yards of material that it will hold. The capacity of most large electric shovels is typically in the range of 70 to 80 cubic yards, commonly quoted as 70 to 80 yards. The capacity of hydraulic excavators is typically in the range of 45 to 50 cubic yards.

Once the operator moves the shovel to the desired area, the boom is swung toward the pile and the bucket is pushed through the pile until it is full of material. In order to maximize the operating time of the shovel, several trucks are used. Trucks typically line up on either side of the large shovel so that, after a truck on one side is loaded, the shovel operator swings to the opposite side to continue operating. A line of trucks is typically formed on each side of the shovel in order to maximize productivity of the shovel and avoid shutting down the loading operation. Operating in this manner, a large electrical shovel with a 70 yard bucket can typically load about 14,000 tons of earth per hour.

Although this production rate is impressive, the efficiency of the shovel is limited by the dead time that occurs with each loading cycle of a truck. A loading cycle includes the time it takes for the operator to drive the bucket through the pile, swing the loaded bucket from the pile while raising it above the truck, then release the load into the truck. The typical cycle time on large shovels is typically around 35 seconds. The truck is therefore sitting idle for much of the time while the operator runs through his loading cycle and this reduces the efficiency of the operation. With the high cost of fuel and the enactment of legislation reducing carbon emissions of trucks, the costs of operating large electric or hydraulic shovels is very expensive. The cost of a large electric shovel is also very expensive, typically in the range of $30 million for a 70 yard shovel.

Accordingly, there is a need to reduce the unproductive time and improve the efficiency in moving large quantities of heavy material to a waiting transport vehicle such as a truck. It would also be beneficial to reduce the cost of the equipment for performing this operation.

SUMMARY OF THE INVENTION

The present invention is directed to an excavating and loading apparatus and method. The excavating and loading apparatus includes an excavator and a stacker conveyor. The excavator includes paired crawler tracks and an articulated boom with a bucket. The excavator further includes an inclined feeder conveyor with an intake end and a discharge end. A wide apron is positioned at the intake end of the feeder conveyor. The apron includes a left-hand side and right-hand side load receiving area that are arranged on opposing sides of the intake end of the feeder conveyor. Two double-hinged feeder blades are positioned at the apron. The feeder blades are arranged to operate asynchronously. Each feeder blade includes a main blade and a wing blade. The stacker conveyor is on paired crawler tracks and includes an intake end and a discharge end. The articulated boom pulls material to a first side of the apron in which the feeder blades are open, after which the feeder blades on that side activate and push the material from that side of the apron onto the intake end of the feeder conveyor. The feeder conveyor runs continuously and delivers the loaded material to the stacker conveyor which delivers the material to a waiting truck, similar haulage vehicle, or feeder-breaker to be crushed and fed onto an overland conveyor. The excavating and loading apparatus continues to load in this manner, with the double-hinged feeder blades operating asynchronously, wherein a first side of the apron is loaded by the bucket while the opposing side is deactivated after which the first side feeder blades are deactivated and the second side feeder blades are activated. In this manner, asynchronous operation of the feeder blades continuously delivers material to the feeder conveyor whereupon the feeder conveyor continuously delivers material to the stacker conveyor.

OBJECTS AND ADVANTAGES

A first object of the invention is to provide an excavating and loading apparatus that is more efficient than conventional large electric or hydraulic shovels in loading trucks or similar vehicles. This is accomplished by reducing the non-productive cycle time that is typical of large conventional shovels. A large shovel typically requires 35 seconds to complete one cycle, which includes pulling the bucket through the muck, swinging the boom to position the bucket over the truck, dumping the bucket contents into the truck, and then swinging the boom and bucket back to the muck. The excavating and loading apparatus of the current invention operates continuously, with the backhoe reaching up and out into the material and pulling it to the apron. The apron is thus continually fed by a bucket and a feeder conveyor and stacker conveyor continuously transport the material to a truck or similar vehicle.

A second object is to provide a large volume excavating and loading apparatus that can be produced at a substantially lower cost than conventional electric shovels. A conventional electric shovel typically costs about $30 million. The excavating and loading apparatus of the present invention would cost about half of the cost of a typical electric shovel.

A third object is to provide an excavating and loading apparatus that will load at a higher rate than conventional electric shovels. The excavating and loading apparatus of the present invention is capable of loading at a rate of 16,000 tons per hour versus a rate of 14,000 tons per hour for a conventional electric shovel with a 70 cubic yard bucket.

A further object is to provide a high volume excavating and loading apparatus that is much smaller than conventional electric shovels. As a result of the continuous conveying of the mined material from the front apron of the excavator to the truck bed, the cycle time is substantially lower than the cycle time of a typical electric shovel. This is a result of eliminating the need to swing the boom from the pile to the truck, dump the bucket contents, and then swing the boom back into the digging position. The boom and bucket are operated constantly in excavating and loading apparatus of the present invention and there is no need to swing the load back to the truck as the double hinged feeder blades operate alternately to push mined material from the apron to the feed conveyor and on to the stacking conveyor to convey the load to the truck or feeder-breaker.

These and other objects and advantages of the present invention will be better understood by reading the following description along with reference to the drawings.

DETAILED DESCRIPTION OF THE INVENTION

Figure 1:
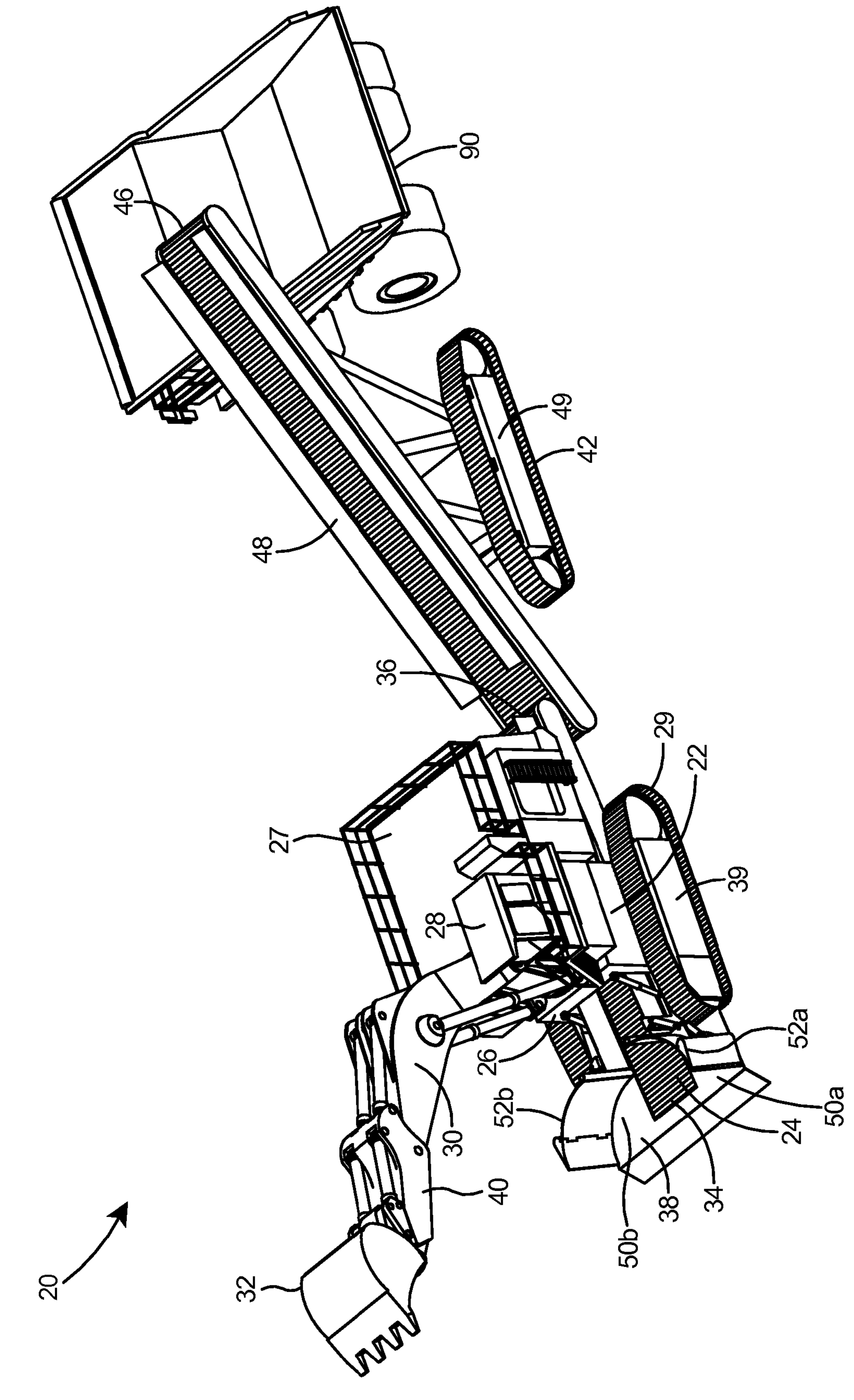
FIG. 1 is a perspective view of the preferred embodiment of an excavating and loading apparatus according to the present invention.

With reference to FIG. 1 there is shown the preferred embodiment of an excavating and loading apparatus 20 according to the present invention. The excavating and loading apparatus 20 includes an excavator 22, a feeder conveyor 24, and a stacker conveyor 25. The excavator 22 includes a front end 26, an upper stage 27 that includes a control station 28, paired crawler tracks 29, and an articulated boom 30 with a bucket 32. The feeder conveyor 24 is pinned beneath the upper stage 27 and includes an intake end 34 and a discharge end 36. A wide apron 38 is positioned at the intake end 34 of the feeder conveyor 24. The paired crawler tracks 29 of the excavator are supported by a crawler frame 39.

Figure 2:
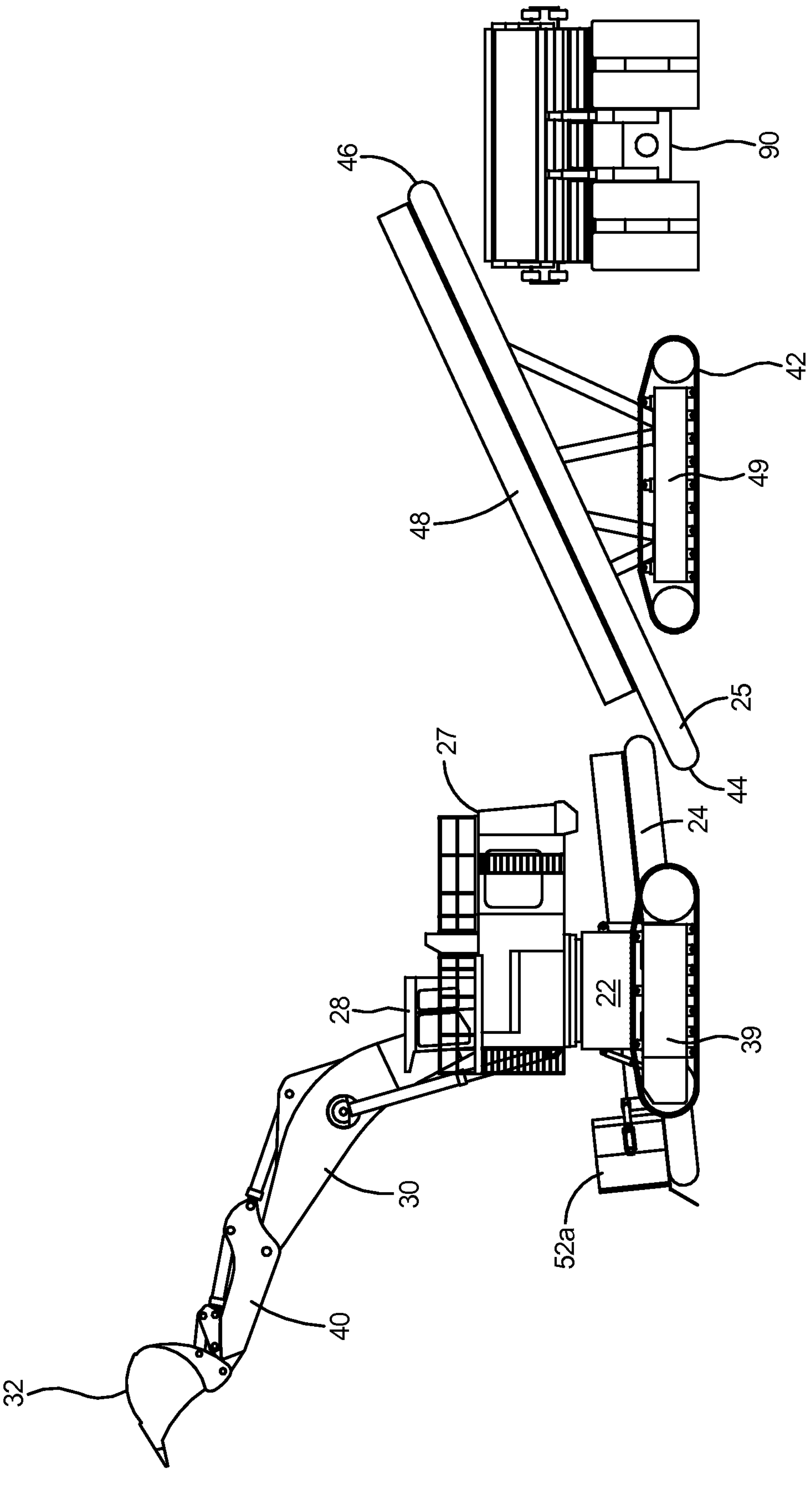
FIG. 2 is a side elevation view of the excavating and loading apparatus of FIG. 1.

Referring to FIG. 2, the excavator 22 is connected to bucket 32 by articulated boom 30 and stick 40. The stacker conveyor 25 is on paired crawler tracks 42 and includes an intake end 44, a discharge end 46, and side walls 48 for containing material on the stacker conveyor. The paired crawler tracks 42 of the stacker conveyor 25 are supported by a crawler frame 49.

Figure 3:
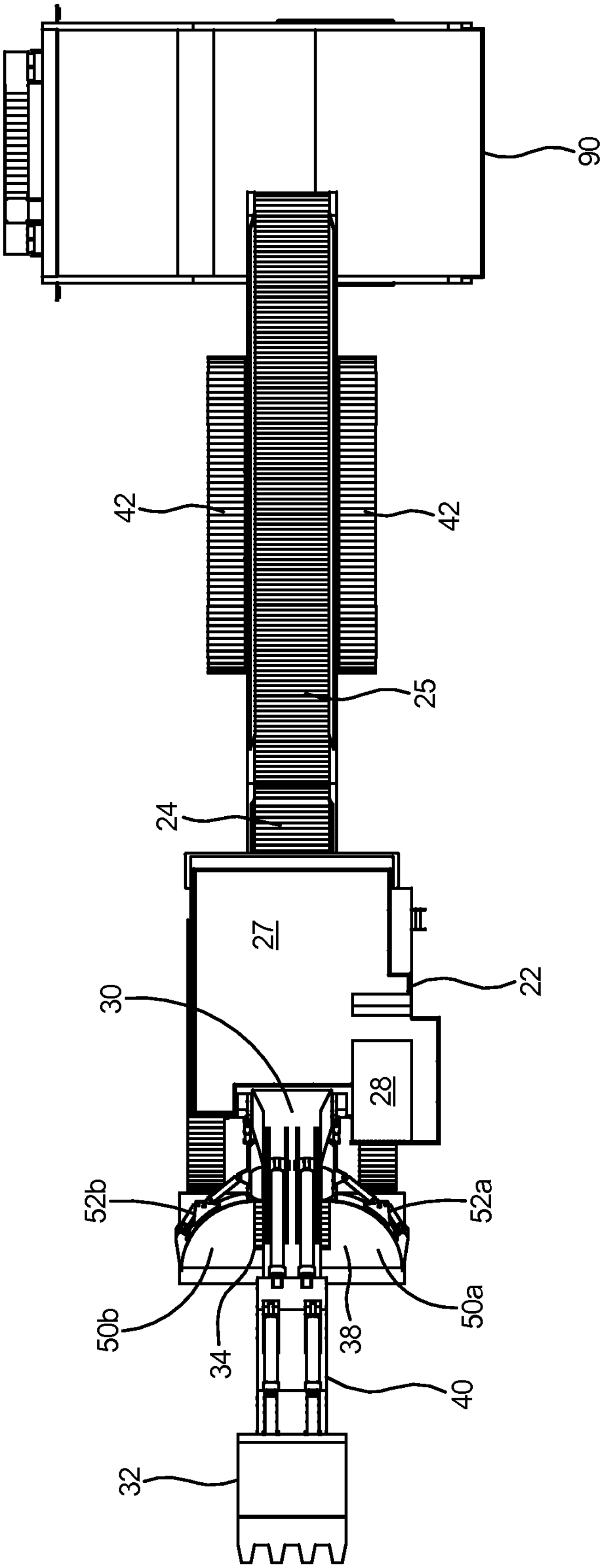
FIG. 3 is a top view of the excavating and loading apparatus.

As shown in FIG. 3, with boom 30 and stick 40 extended along the axial center of the excavator 22 the bucket 32 extends in front of the apron 32. The apron 38 includes a left side load receiving area 50*a* and right side load receiving area 50*b* that are each capable of receiving a load of material. The load receiving areas 50*a* and 50*b* are arranged on opposing sides of the intake end 34 of the feeder conveyor 24. Two double-hinged feeder blades including a left-hand feeder blade 52*a* and a right-hand feeder blade 52*b* are positioned at the rear 54 of the apron 38. The double hinged feeder blades 52*a* and 52*b* are arranged to operate asynchronously.

Figure 4:
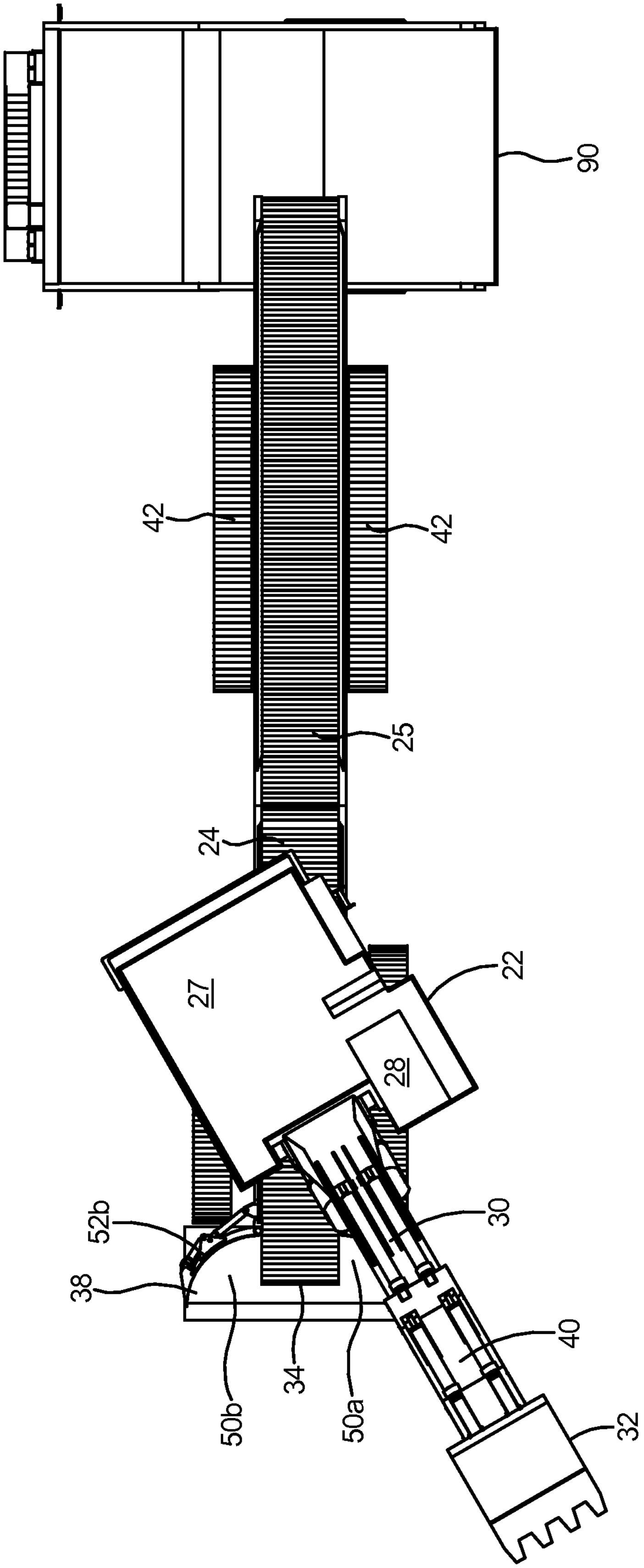
FIG. 4 is a top view of the excavating and loading apparatus with the control cabin rotated to load the left side of the apron.
Figure 5:
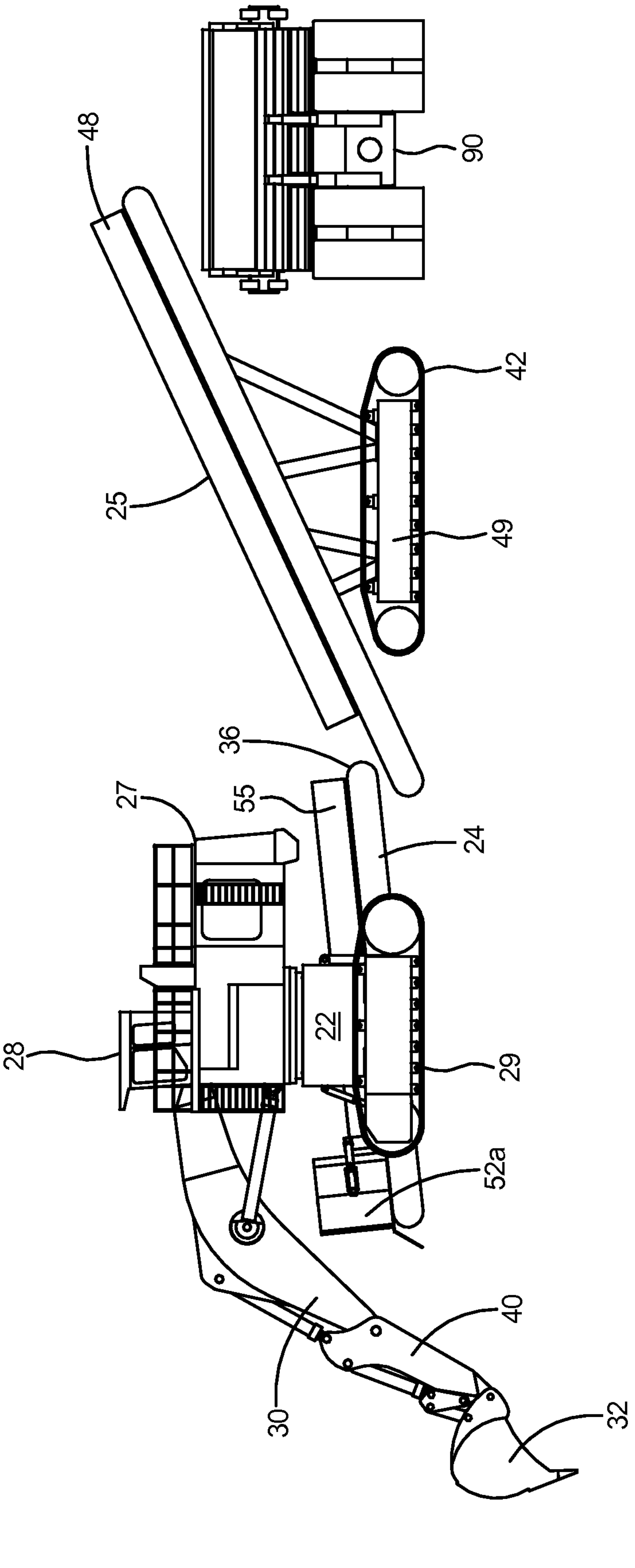
FIG. 5 is a side view of the excavating and loading apparatus with the boom and bucket directed downward to dig below grade.
Figure 6:
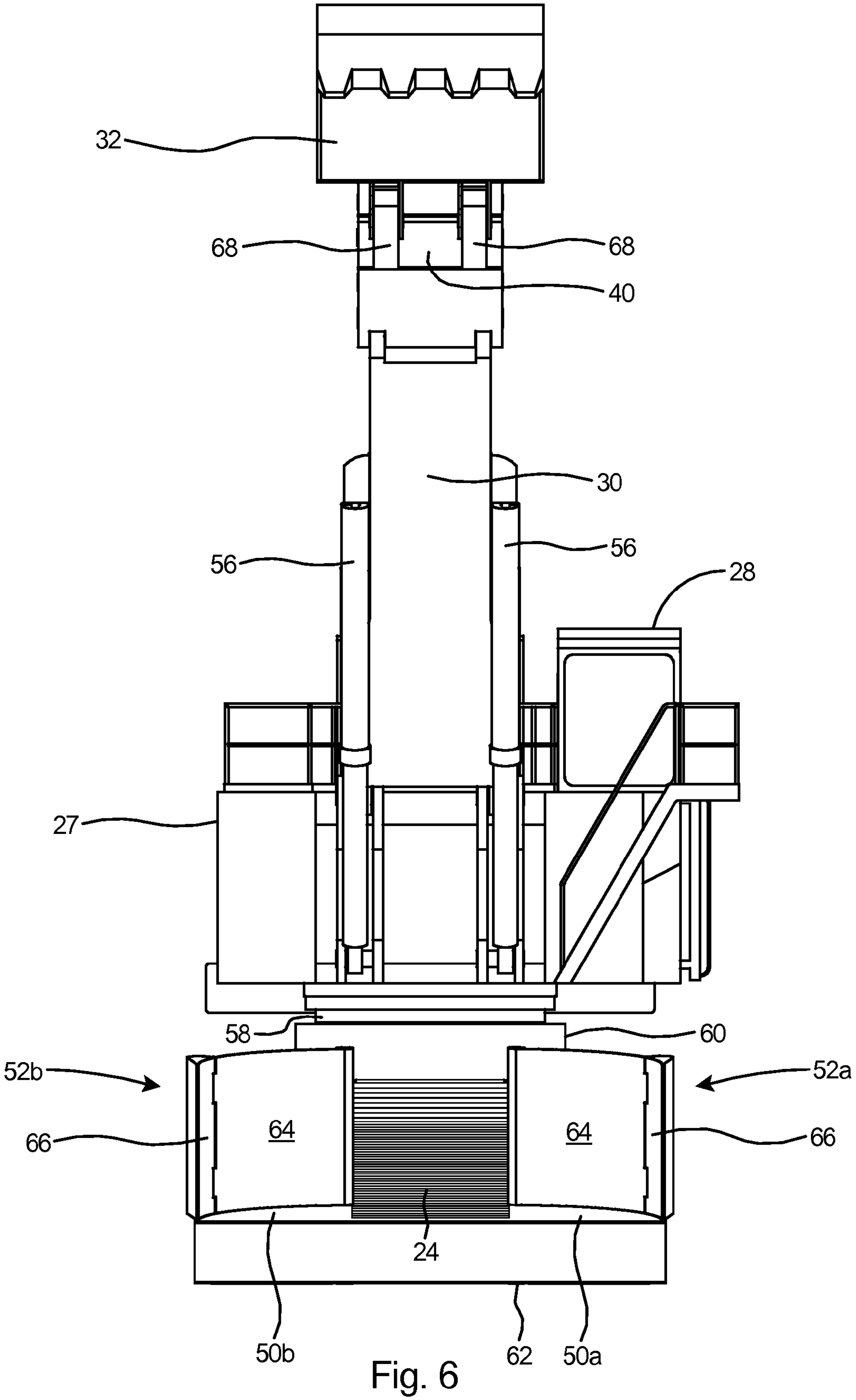
FIG. 6 is a front view of the excavating and loading apparatus with the boom and bucket raised.

With reference to FIG. 4, the upper stage 27 and articulated boom 30 are capable of being rotated by approximately 30° to each side. With the upper stage 27 rotated 30° to the left as shown and with left-hand feeder blade 52*a* open, or positioned at the rear 54 of the apron 38, the bucket 32 can be retracted in order to pull material onto the left side load receiving area 50*a*. Conversely, with the right-hand feeder blade 52*b* open, the upper stage 27 and articulated boom 30 can be rotated by approximately 30° to the right side in order to pull material onto the right side load receiving area 50*b*. As shown in FIG. 5, feeder conveyor 24 includes side walls 55 that contain material on the conveyor. 29) Referring to FIG. 6, the angle of boom 30 can be changed by actuating paired boom cylinders 56, which are preferably hydraulic cylinders. A slewing bearing 58 connects the upper stage 27 to the lower frame 60 and enables the upper stage 27 and articulated boom 30 to rotate with respect to the lower frame. As shown apron 38 includes a front edge 62 that can be lowered to meet grade level at the excavation site. Double-hinged feeder blades including left-hand blade 52*a* and right-hand blade 52*b* each include a main blade 64 and a wing blade 66.

Figure 7:
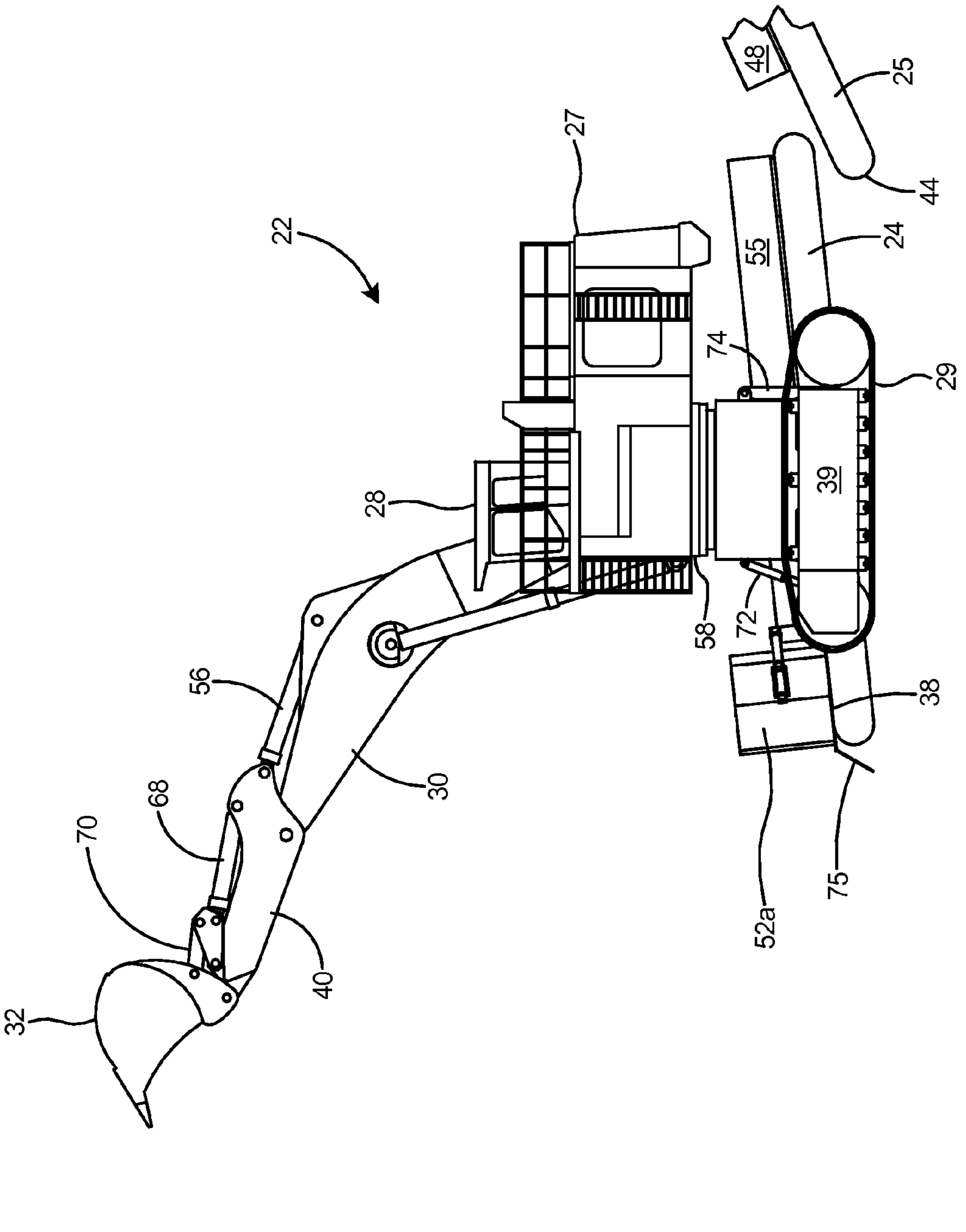
FIG. 7 is a side elevation view of the excavator portion of the excavating and loading apparatus of the present invention.

As shown in FIG. 7, articulated boom 30 further includes stick cylinders 68 to change the angle of stick 40 with respect to boom 30, and bucket cylinders 70 in order to change the angle of the bucket 32 with respect to the stick 40. Controls for actuating any of the cylinders are located in control station 28, and can be manipulated by the operator as required to pull material onto the apron 38. An apron cylinder 72 extends between the front of the lower frame 60 and apron 38 and enables the operator to raise and lower the apron 38 and the intake end 34 of the feeder conveyor 24. The apron 38 is typically lowered to ground level for loading material onto the apron and is typically raised in preparation for activating excavator crawler tracks 29 for moving the excavator 22 to a new location. The excavator 22 further includes a pin 74 extending between the rear of the lower frame 60 and the feeder conveyor 24. The pin 74 enables the discharge end 36 of the feeder conveyor 24 to pivot with respect to the lower frame 60. During loading operations of the excavator 22, the discharge end 36 of feeder conveyor 24 is pinned higher than the input end 44 of stacker conveyor 25. Apron 38 includes a nose portion 75 extending downward from its front edge.

Figure 8:
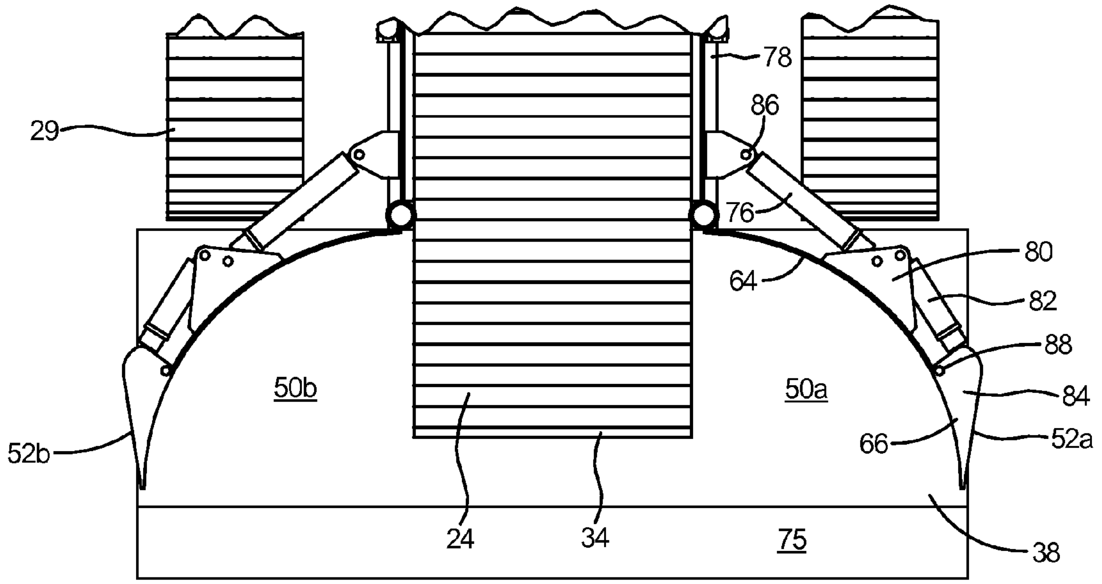
FIG. 8 is a top view of the apron portion of the excavating and loading apparatus depicting the double hinged feeder blades in the open position.

FIGS. 8-11 are top views of the apron 38 portion of the excavating and loading apparatus depicting the double-hinged feeder blades 52*a* and 52*b* in various positions during a typical loading operation. As shown in FIG. 8, initially the left-side hinged feeder blade 52*a* and the right-side hinged feeder blade 52*b* are in the open position, with the feeder blades positioned near the rear 54 of the apron 38. Left-side feeder blade 52*a* is positioned behind left side load receiving area 50*a* and right-side feeder blade 52*b* is positioned behind right side load receiving area 50*b*. Both the left and right side feeder blades include a main blade cylinder 76 connecting at one end to the feeder conveyor framework 78 and at its opposing end to a bracket 80 on the main blade 64. A wing blade cylinder 82 extends between bracket 80 and bracket 84 on the wing blade 66. Thus, via activation of main blade cylinder 76 and wing blade cylinder 82, main blade 64 can pivot around main pin 86 and wing blade 66 can pivot around wing pin 88. Thus FIG. 8 depicts the double-hinged feeder blades 52*a* and 52*b* in the open position.

Figure 9:
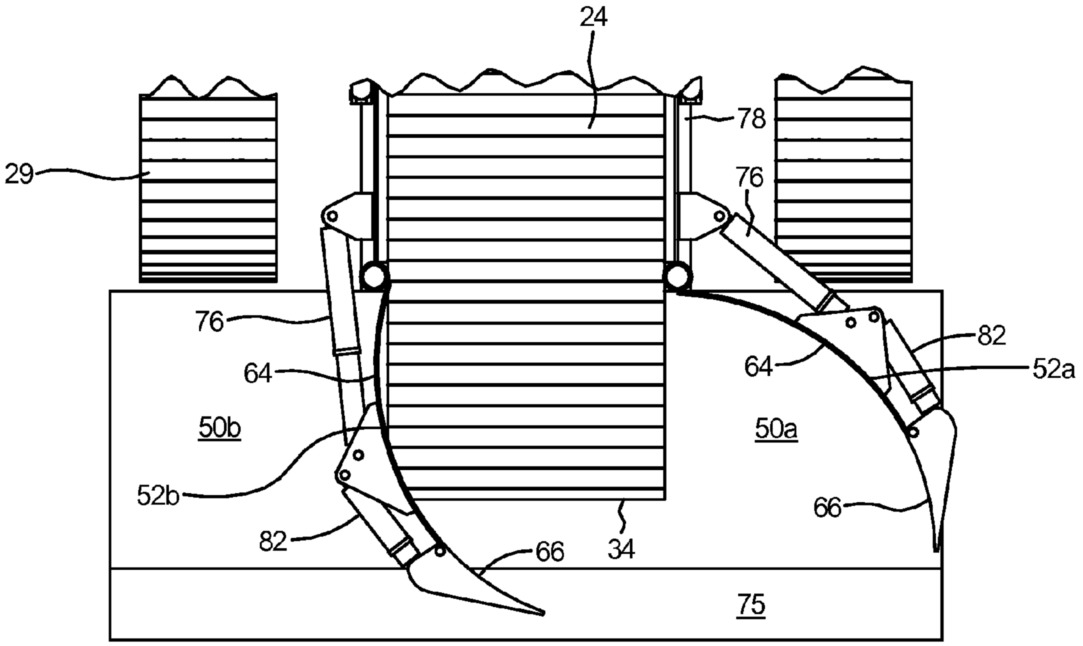
FIG. 9 is a top view of the apron area depicting the main blade of the right side double hinged feeder blade in its fully extended position and the wing blade open.

With reference to FIG. 9, after the excavator has loaded material onto the right side load receiving area 50*b*, main blade cylinder 76 is extended to push material from the right side load receiving area 50*b* onto the intake end 34 of the feeder conveyor 24. FIG. 9 depicts the main blade 64 closed and wing blade 66 open.

Figure 10:
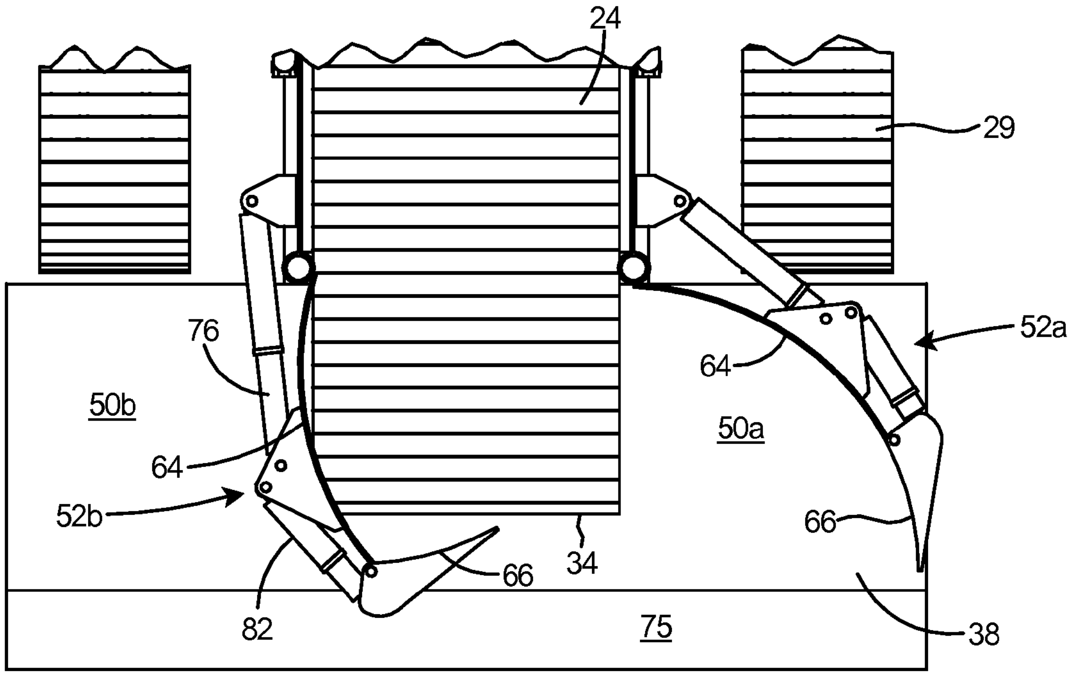
FIG. 10 is a top view of the apron area depicting the main blade of the right side double hinged feeder blade in its fully extended position and the wing blade closed.

Referring to FIG. 10, after the main blade 64 is closed, wing blade cylinder 82 is fully extended to fully close the wing blade 66 and thereby further push material from the apron 38 and the nose portion 75 portion of apron 38 onto the intake end 34 of the feeder conveyor 24. This effectively pushes all material from the right side load receiving area 50*b* onto the feeder conveyor 24.

Figure 11:
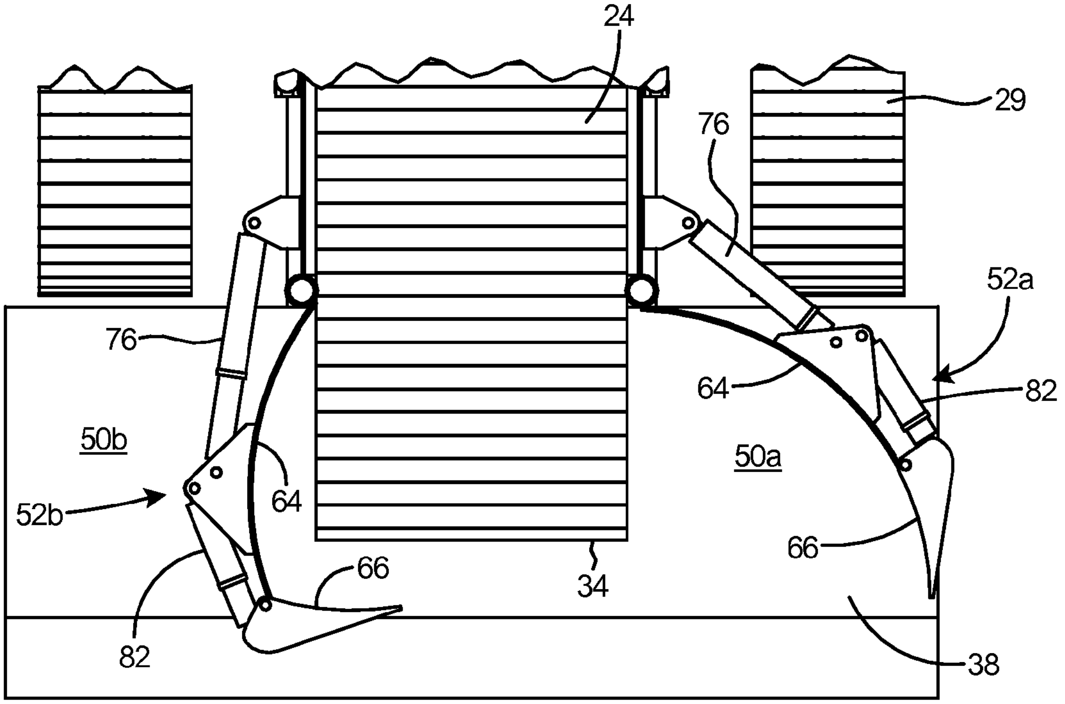
FIG. 11 is a top view of the apron area depicting the main blade of the right side double hinged feeder blade partially during its closing sequence with the main blade retracted from its fully extended position.

With reference to FIG. 11, after the material on the right side load receiving area 50*b* has been pushed onto the feeder conveyor 24, main blade cylinder 76 begins to retract and pulls the main blade 64 toward the open position. As main blade 64 is opening, wing blade 66 remains closed until main blade 64 is fully open. Wing blade cylinder 82 is then retracted to fully open the wing blade 66. After the material on right side load receiving area 50*b* has been forced onto the feeder conveyor 24, the right side wing blade 66 critically is kept closed while main blade 64 is opening. At the same time right-side hinged feeder blade 52*b* is sequencing from closed to open position, the left side load receiving area 50*a* becomes active and may be reloaded with material from the bucket (not shown). Thus the wing blade 66 is held closed on the feeder blade 52*b* that is in the process of opening in order to keep the load receiving area 50*a* on the opposing side open and ready to accept material. The double hinged feeder blades 52*a* and 52*b* are designed to operate asynchronously. The asynchronous operation is controlled by a microprocessor to ensure that one load receiving side of the apron 38 is open while the opposing load receiving side of the apron is closed.

As shown in FIG. 11, the feeder conveyor 24 extends a substantial distance into the apron 38. Thus, as either of the hinged feeder blades 52*a* and 52*b* is closed, material will quickly be transferred from the load receiving area onto the intake end 34 of the feeder conveyor 24. Operation of the excavating and loading apparatus is continuous as the hinged feeder blades 52*a* and 52*b* continue to open asynchronously and the operator pulls material onto the open side of the apron 38 as needed.

With reference to FIG. 1, in operation, the articulated boom 30 is extended onto the pile and is retracted to pull material onto a first side 50*a* or 50*b* of the apron 38. The double-hinged feeder blades 52*a* or 52*b* on the loaded side of the apron are then activated in the sequence described hereinabove to push material onto the feeder conveyor 24. After the active feeder blade is in its fully closed position, the bucket is used to pull material onto the opposing side of the apron. After the double-hinged feeder blade on the first side is returned to the open position, the double-hinged feeder blade on the opposing side is activated to push the material on that side of the apron 38 onto the feeder conveyor 24. The double-hinged feeder blades 52*a* and 52*b* continue to operate asynchronously as the operator continues to pull material to the empty side of the apron at the proper time during each cycle. The asynchronous cycling of the double hinged feeder blades 52*a* and 52*b* continues while the articulated boom 30 and bucket 32 are operated to alternatively load the open side of the apron 38. While the excavator 22 is continues to work to fill the apron 38, the feeder conveyor 24 and the stacker conveyor 25 run continuously to deliver the excavated material to the truck 90.

As the apron 38 is continually reloaded with material by the excavator 22, the inclined feeder conveyor 24 runs continuously and conveys material to the rear of the excavator and onto the stacker conveyor 25. The intake end 34 of the feeder conveyor 24 is positioned in the middle of the apron 38, thus, as each double hinged feeder blade 52*a* and 52*b* closes, the feeder conveyor 24 is reloaded with material. The stacker conveyor 25 receives material from the discharge end 36 of the feeder conveyor 24 and runs continuously to convey the material to its discharge end 46 whereupon the material falls into a waiting truck 90, similar haulage vehicle, or feeder-breaker to be crushed.

Although the description above contains many specific descriptions, materials, and dimensions, these should not be construed as limiting the scope of the invention but as merely providing illustrations of some of the presently preferred embodiments of this invention. Thus the scope of the invention should be determined by the appended claims and their legal equivalents, rather than by the examples given.

What is claimed is:

1. An excavating and loading apparatus comprising:

an excavator including an upper stage and crawler tracks, said upper stage rotatable with respect to said crawler tracks;

an inclined feeder conveyor extending under said upper stage of said excavator;

an articulated boom extending from said upper stage;

a stacker conveyor for receiving material from said feeder conveyor;

a bucket on said articulated boom;

power and control means for running said crawler tracks, said articulated boom including said bucket, and said inclined feeder conveyor, and a second power and control means for running said stacker conveyor;

a front end on said excavator;

an apron on said front end of said excavator, said apron including a front and a rear;

said feeder conveyor includes an intake end on said apron of said conveyor, a discharge end, and a feeder conveyor framework; and two double-hinged feeder blades at the rear of said apron.

2. The excavating and loading apparatus of claim 1 wherein said double-hinged feeder blades are operated asynchronously.

3. The excavating and loading apparatus of claim 2 wherein each of said double-hinged feeder blades include a main blade pivotably connected at one end to said feeder conveyor framework; and a wing blade pivotably connected at the opposing end of said main blade.

4. The excavating and loading apparatus of claim 3 including a main pin for enabling said pivotable connection of said main blade to said feeder conveyor framework; and a wing pin for enabling said pivotable connection of said wing blade to said main blade, a wing blade cylinder extending between said main blade and said wing blade.

5. The excavating and loading apparatus of claim 4 including a main blade cylinder extending between said feeder conveyor frame and said main blade, said main blade cylinder enabling pivoting of said main blade around said main pin; and a wing blade cylinder extending between said main blade and said wing blade, said wing blade cylinder enabling pivoting of said wing blade around said wing pin.

6. The excavating and loading apparatus of claim 1 wherein said articulating boom includes a boom extending from said upper stage; and a stick extending from said boom.

7. The excavating and loading apparatus of claim 1 including a lower frame; and a slewing bearing connecting said upper stage to said lower frame, said slewing bearing enabling said upper stage and said articulated boom to rotate with respect to said lower frame.

8. The excavating and loading apparatus of claim 7 wherein said feeder conveyor is pinned to said lower stage of said excavator.

9. The excavating and loading apparatus of claim 8 including an apron cylinder extending between said lower frame and said apron, said apron cylinder enabling raising and lowering of said apron and said intake end of said feeder conveyor.

10. The excavating and loading apparatus of claim 8 including a pin extending between said lower frame and said feeder conveyor, said pin enabling said discharge end of said feeder conveyor to pivot with respect to said lower frame.

11. The excavating and loading apparatus of claim 1 including side walls on said stacker conveyor.

12. The excavating and loading apparatus of claim 1 wherein said feeder conveyor extends a substantial distance into said apron.

13. The excavating and loading apparatus of claim 1 wherein said apron includes a left side load receiving area and a right side load receiving area;

said double-hinged feeder blades include a left-hand feeder blade and a right-hand feeder blade; and said left-hand feeder blade is positioned to push material from said left side load receiving area onto said feeder conveyor and said right-hand feeder blade is positioned to push material from said right side load receiving area onto said feeder conveyor.

14. An excavating and loading apparatus comprising:

an excavator including an upper stage and crawler tracks, said upper stage rotatable with respect to said crawler tracks;

an inclined feeder conveyor extending under said upper stage of said excavator;

an articulated boom extending from said upper stage;

a stacker conveyor for receiving material from said feeder conveyor;

a bucket on said articulated boom;

power and control means for running said crawler tracks, said articulated boom including said bucket, and said inclined feeder conveyor, and a second power and control means for running said stacker conveyor;

a boom extending from said upper stage;

a stick extending from said boom;

a boom cylinder extending between said upper stage and said boom, said boom cylinder enabling changing of the angle of said boom with respect to said upper stage;

a stick cylinder extending between said boom and said stick, said stick cylinder enabling changing of the angle of said stick with respect to said boom;

a bucket cylinder extending between said stick and said bucket, said bucket cylinder enabling changing of the angle of said bucket with respect to said stick; and a controller for actuating said boom cylinder, said stick cylinder, and said bucket cylinder.

15. A method of excavating and loading earthen material including providing an excavating and loading apparatus including an excavator having an apron, an articulating boom and a bucket adapted to send material to said apron, an inclined feeder conveyor including an intake end adapted to accept material from said apron, a feeder conveyor adapted to accept material from said feeder conveyor, power and control means for running said excavator and said inclined feeder conveyor, and a second power and control means for running said stacker conveyor;

providing two load receiving areas on said apron;

providing two double-hinged feeder blades on said apron;

pulling material onto said apron with said articulating boom and said bucket;

operating said double-hinged feeder blades asynchronously to push material in sequence from each of said load receiving areas onto said feeder conveyor;

continuously running said feeder conveyor to convey material onto said stacker conveyor; and continuously running said stacker conveyor to convey material from said stacker conveyor into a haulage vehicle.

16. The method of excavating and loading earthen material of claim 15 including an upper stage and a lower frame on said excavator; and a slewing bearing connecting said upper stage to said lower frame, said slewing bearing enabling said upper stage and said articulated boom to rotate with respect to said lower frame.

17. The method of excavating and loading earthen material of claim 15 wherein said double-hinged feeder blades include a main blade pivotably connected at one end to said feeder conveyor; and a wing blade pivotably connected at the opposing end of said main blade.

* * * * *